United States Patent [19]

Matousek et al.

[11] 4,044,631
[45] Aug. 30, 1977

[54] ROTARY ACTUATOR

[75] Inventors: Stephen Matousek; Ulrich H. Koch, both of Chagrin Falls, Ohio

[73] Assignee: Whitney Research Tool Company, Emeryville, Calif.

[21] Appl. No.: 579,467

[22] Filed: May 21, 1975

[51] Int. Cl.² .......................................... F16H 57/02
[52] U.S. Cl. .................................. 74/606 R; 92/139; 92/161
[58] Field of Search .................. 74/606; 92/136, 135, 92/161; 248/14

[56] References Cited

U.S. PATENT DOCUMENTS

| | | | |
|---|---|---|---|
| 1,548,833 | 8/1925 | Flegel | 248/14 |
| 2,344,055 | 3/1944 | Osborn | 92/135 |
| 2,559,137 | 11/1960 | Russell | 92/161 |
| 2,737,157 | 3/1956 | Hefner et al. | 92/161 |
| 2,814,995 | 12/1957 | Sullivan, Jr. et al. | 92/161 |
| 3,477,177 | 11/1969 | Tucker, Jr. | 92/136 |
| 3,498,187 | 3/1970 | Stringfellow | 92/136 |
| 3,566,751 | 3/1971 | Sheppard | 92/136 |
| 3,581,625 | 6/1971 | Michalak | 92/135 |
| 3,637,171 | 1/1972 | Kroeger | 248/14 |
| 3,744,381 | 7/1973 | Travaglio | 92/161 |

OTHER PUBLICATIONS

Mounting Bracket Motor; Gingerich; 4/1974; IBM Tech. Disc. Bul., vol. 16 No. 11, p. 3493.

*Primary Examiner*—Samuel Scott
*Assistant Examiner*—Wesley S. Ratliff, Jr.
*Attorney, Agent, or Firm*—Fay & Sharpe

[57] ABSTRACT

A rotary actuator wherein linear movement of a piston and rack assembly disposed in a unitary housing is converted to precise rotational movement of an operating member mounted to a pinion which operably engages the rack. The operating member extends outwardly from opposite sides of the housing and is adapted for coupling with either a single or a pair of mechanisms for purposes of selectively controlling operation of the mechanisms. The actuator includes new means for locating and supporting the rack, for locating and sealing a pinion assembly in the housing, for precisely controlling rotational movement of the operating member, and for precisely and positively locating mechanism mounting brackets to the housing. The actuator may be either single or double acting.

21 Claims, 10 Drawing Figures

ROTARY ACTUATOR

BACKGROUND OF THE INVENTION

This application pertains to the art of mechanism actuators and more particularly to rotary actuators.

The invention is particularly applicable to a rotary actuator for use in controlling fluid flow through valves and the like and will be described with particular reference thereto; however, it will be appreciated by those skilled in the art that the invention has broader applications and may be employed in other environments where rotary movement is desired and/or necessary for purposes of controlling operation of any mechanism.

Many types of rotary actuators of the rack and pinion type are known in the art and many of them have been developed for specific control applications. However, virtually all of these prior actuators have had complex constructions or have been comprised of a substantial number of components so that during assembly thereof there was undesired tolerance build-ups or stacking in the final actuator assembly. Even those prior actuators which contemplated simpler designs still were constructed in such a manner that tolerance stacking was present. While such a condition may not cause difficulty where the control limitations of the actuator are not important or critical, tolerance build-ups are extremely undesirable and unacceptable in those instances where the actuator will be employed for providing very precise rotary control between closely defined limits for mechanisms such as, for example, valves or the like and automated instruments such as chromatographs and analysers.

Another problem which has been present in prior actuators is the nature and/or lack of support for the elongated rack member which is employed to impart rotatonal movement to a pinion for purposes of converting linear movement to rotational movement. Here, again, where precision control is not a factor, the lack of such locating and support means is not particularly significant although wear and premature failure of the apparatus between the rack and pinion may result. However, the improperly designed locating and support means, or the lack thereof altogether, can cause overall operational difficulties as well as imprecise operation.

Two prior patents which disclose structures that typically demonstrate the foregoing problems are the Heese, U.S. Pat. No. 3,494,205 and Van Sittert, U.S. Pat. No. 2,224,708 patents. By virtue of the sheer number of components in Heese, tolerance build-ups will occur between the components so that a precise control function when using the actuator disclosed by this patent is not possible. Also, there is no means provided for positively locating and supporting the rack in the Heese type actuator. Thus, it is possible for the rack to rotate slightly relative to the pinion and cause premature wear or failure between these two components. Van Sittert also discloses a structure where tolerance build-ups will occur. Likewise, the rack locating and supporting structure is such that only minimal support is provided for the rack. Again, these structural deficiencies are unacceptable for actuators of the type required for providing precise rotary control between predetermined close limits.

Another area of objection to prior rotary actuators is the fact that many of them merely facilitate control of a single mechanism through means of a single ended operating member. Oftentimes, it is desirable to control at least a pair of mechanisms by means of a single actuator, particularly in a complex system control environment where, for example, a plurality of valves or the like are employed in a system for controlling fluid flow.

Another deficiency in prior rotary actuator designs relates to the means provided for mounting mechanisms to the actuators themselves. For those environments where precision rotary control is required, it is imperative that the mechanisms be precisely located relative to the actuator in order that proper and desired rotary control may be realized. Prior actuators have not addressed themselves to the provision of convenient means to meet this need.

The present invention contemplates a new and improved apparatus which overcomes these problems and others, and provides a new and improved rotary actuator which is simple in design, economical to manufacture, provides precise rotary movement between closely defined limits and is readily adaptable to use in any number of environments for controlling various types of mechanisms.

BRIEF DESCRIPTION OF THE INVENTION

In accordance with the present invention, there is provided a rotary actuator which includes in combination, a unitary housing having first and second cylindrical bores communicating with each other in an end to end relationship. At least the end of the first bore spaced from the second bore is open, and an open ended third bore communicates with and extends generally normal to the second bore. A piston is closely received in the first bore for selective movement between first and second positions therein and an elongated rack extends outwardly from one face of the piston into the second bore. A pinion assembly is disposed in the third bore in operative engagement with the rack and the pinion portion of this assembly includes an elongated operating member which extends outwardly of the third bore. A rack bushing is received in the second bore at least on the side thereof opposite the zone of operative engagement between the rack and pinion. This bushing serves as a means for guiding and supporting the rack. Separate means are also included for closing the open end of the first bore. The actuator further includes means for selectively forcing the piston between the first and second positions and internal means for precisely establishing the first and second positions of the piston.

In accordance with a more limited aspect of the present invention, the rack bushing extends at least along a longitudinal portion of the second bore with the outer wall of the bushing being closely received in engagement with the second bore in excess of 180° of the diameter of the second bore. The bushing further includes a longitudinal groove for receiving portions of the bottom and side wall surfaces of part of the length of the rack.

In accordance with another more limited aspect of the present invention, the pinion is received on the elongated operating member and affixed thereto to prevent relative rotation therebetween. The pinion is generally centrally disposed in the third bore with a bearing assembly positioned on each side thereof. The bearing assemblies each comprise: a retaining clip disposed on the operating member adjacent each side of the pinion; an annular thrust washer received over the operating member adjacent each side of the pinion; an operating member bushing closely received on the third bore over the operating member adjacent each of the thrust washers, the operating member bushings further including sealing means; and, a retaining ring disposed adjacent each of the operating member bushings in locking engagement with the side wall of the third bore for retaining the pinion, operating member and the remainder of the packing assembly in position within the third bore.

In accordance with another aspect of the present invention, the subject actuator includes means within the first bore for precisely defining the first and second positions of the piston in order that, in turn, the amount of rotation of the pinion and operating member will be precisely and positively determined.

In accordance with still another aspect of the present invention, the actuator housing includes an area adjacent at least one end of the third bore for receiving and positively locating a mechanism mounting bracket.

The principal object of the present invention is the provision of a new and improved rotary actuator.

Another object of the present invention is the provision of a new and improved rotary actuator which is simple in design.

Another object of the present invention is the provision of a new and improved rotary actuator which reduces tolerance build-ups between the component parts thereof.

Still another object of the present invention is the provision of a new and improved rotary actuator which provides a substantial support and locating area for the rack within the housing structure.

Yet another object of the present invention is the provision of a new and improved rotary actuator which facilitates direct control of either a single or a pair of mechanisms.

Still a further object of the present invention is the provision of a new and improved rotary actuator which facilitates positively locating mounting brackets to the actuator housing in a plurality of alternative positions.

Still another object of the present invention is the provision of a new and improved rotary actuator which is readily adaptable for use in operating any number of mechanisms in any number of environments.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DESCRIPTION OF THE PREFERRED EMBODIMENT

Referring now to the drawings wherein the showings are for purposes of illustrating the preferred embodiment of the invention only and not for purposes of limiting same, the FIGURES show a rotary actuator having a housing A, a rack and piston assembly B and a pinion assembly C.

Figure 1:
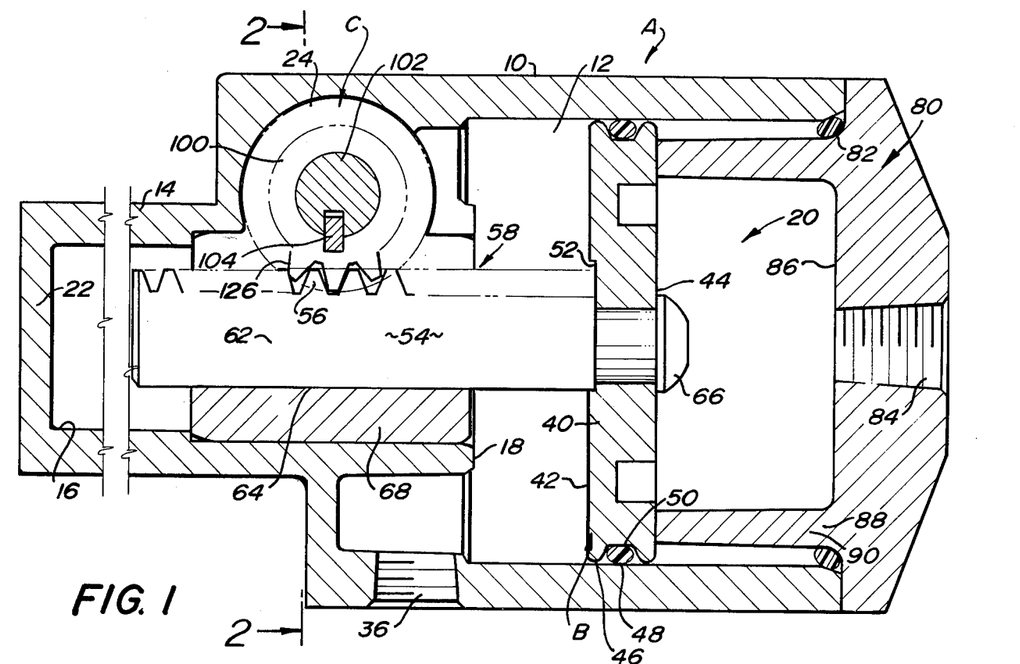
FIG. 1 is a cross-sectional view of one embodiment of the rotary actuator which forms a part of the present invention.

More specifically, in FIG. 1 which shows a double acting actuator, housing A is of a unitary construction having continuous side wall 14 defining a second, smaller bore 16 with bores 12, 16 coaxially disposed relative to each other. The interface between bores 12, 16 establishes a stop member 18 for defining the second position for the piston as will be described in greater detail hereinafter. As used herein, second position merely refers to a relative position of the piston and does not necessarily relate to the normal position of the piston. The first bore is open at end 20, that is, the end spaced from second bore 16, and the second bore is closed at end 22 spaced from first bore 12.

Figure 2:
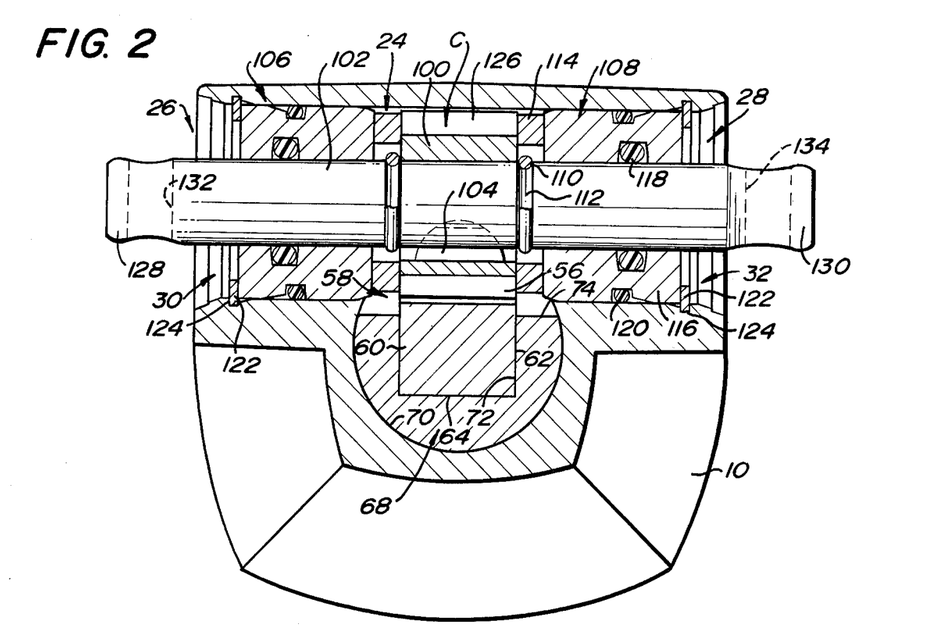
FIG. 2 is a cross-sectional view taken along lines 2—2 of FIG. 1.

A third bore 24 extends through the housing generally normal to and in communication with second bore 16. FIG. 2 shows that third bore 24 is open ended at ends 26,28. These ends, at their outermost portions 30,32, respectively, have a generally square cross-sectional configuration for reasons and purposes to be discussed in greater detail hereinafter. An opening 36, adapted to receive a conventional pressure fitting, extends through side wall 10 to communicate with first bore 12 adjacent the interface area between bores 12,16 for purposes of selectively providing fluid pressure to the bore which will be described hereinafter with reference to actuator operation. In the preferred embodiment of the present invention, housing A is die cast from aluminum, although it will be appreciated that other materials and construction techniques could be used without departing from the intent and scope of the invention.

Rack and piston assembly B includes a piston generally designated 40 having opposed end faces 42,44 and a peripheral outer surface 46 closely slidably received in bore 12. An O-ring sealing member 48 or the like is received in a groove 50 included in outer surface 46 for purposes of providing a fluid seal between piston 40 and bore 12. Included within face 42 of piston 40 is a rack receiving area 52 which has a cross-sectional configuration dimensioned to closely receive rack 54. In the preferred arrangement, the piston is die cast from aluminum with receiving area 52 formed integrally into the piston during casting. Other materials and processes may also be used without departing from the intent and scope of the present invention.

Rack 54 is an elongated member having teeth 56 disposed in the upper surface 58 thereof, and having one end received in receiving area 52 with the other end thereof extending into second bore 16. In the preferred arrangement of the present invention, the rack has a generally square cross-sectional configuration including side wall surfaces 60,62 and a bottom wall surface 64. It has been found that the square configuration is particularly desirable for reasons of supporting and locating the rack as will be described in detail hereinafter. Further, conventional square or rectangular steel stock having the rack teeth 56 already provided therein may be advantageously employed to reduce manufacturing costs. Rack 54 is retained in position within receiving area 52 on piston 40 by means of an elongated threaded fastener 66 passing through the piston from face 44 thereof and into a mating passage formed longitudinally in the rack. The rack is, of course, disposed generally normal to face 42 of the piston.

Located in second bore 16 in communication with rack 54 is a rack bushing generally designated 68 which, in the preferred arrangement is fabricated of bronze. This bushing includes an outer wall surface 70 which closely engages the side wall of second bore 16. Engagement between bore 16 and outer wall 70 preferably extends over at least 180° of the circumference of the second bore for purposes of positively locating and retaining the rack in position within the second bore in engagement with pinion assembly C. In the preferred arrangement of the present invention, the engagement between wall 70 and bore 16 extends approximately 230°-235° over the circumference of the bore although other arrangements could also be advantageously employed. As will be noted from FIG. 1, rack bushing 68 extends longitudinally along only a portion of the second bore and this portion is disposed directly beneath pinion assembly C itself.

Referring again particularly to FIG. 2, it will be seen that the rack bushing includes a longitudinal groove 72 extending inwardly from the bushing top or upper surface 74. The groove is dimensioned so that it will closely receive bottom wall surface 64 and side wall surfaces 60,62 of the rack in a sliding engagement. Due to the close engagement between outer wall 70 and second bore 16 and groove 72 and the bottom and side walls of rack 54, the rack is positively positioned and maintained in such position during operation of the rotary actuator. Also, the characteristics of rack bushing 68 are such that it is easy to machine and to install into the actuator structure. Because of the particular bushing arrangement described, the rack will experience no longitudinal or torsional deflection problems during actuator operation. It is, as has previously been explained, these problems which have caused operational difficulties in prior known actuators.

For purposes of covering open end 20 of first bore 12, there is provided an end cap generally designated 80. This end cap may be conveniently affixed to side wall 10 by any convenient means and, in the preferred embodiment, conventional threaded fasteners (not shown) are employed. Disposed between cap 80 and first bore 12 adjacent open end 20 is a conventional O-ring type seal 82 or the like. Extending through the end cap is an opening 84 adapted to receive a conventional pressure fitting for purposes of providing fluid to the first bore for purposes of moving piston 40 between the first and second positions as will be described hereinafter. Depending inwardly from inner surface 86 of thee end cap is a stop member 88 having a generally circular, cup-like configuration. The outermost end 90 of stop member 88 defines the first position of the piston whereby the piston is thus limited to movement between the first and second positions in the first bore. As used herein, first position merely refers to a relative position of the piston and does not necessarily relate to the normal position of the piston. It should be noted that the outward extension of stop 88 from inner surface 86 may be varied as necessary and/or desired in order to vary the distance between the first and second positions which, in turn, will alter the amouunt of allowable rotation of pinion assembly C. This aspect of the invention will be discussed in greater detail hereinafter. In the preferred arrangement of the present invention, end cap 80 is die cast from aluminum.

Referring particularly to FIG. 2, pinion assembly C is received in third bore 24. This assembly includes a pinion member 100 mounted on an elongated operating member or shaft 102 and retained from relative rotation therewith by means of a key 104. Disposed in third bore 24 on each side of the pinion are bearing assemblies generally designated 106, 108. Since these bearing assemblies are identical, further disclosure will merely be with reference to assembly 108, it being appreciated that assembly 106 is identical thereto unless otherwise specifically noted.

Accordingly, a steel retaining clip 110 is closely received in groove 112 included in the operating member or shaft 102. The grooves for both bearing assemblies are such that the retaining clips will be closely received gainst the side wall surfaces of the pinion. A thrust washer 114 of nylon or the like is next received in the third bore over retaining clip 110 and also adjacent the side wall of the pinion. An operating member or shaft bushing 116 of bronze or the like is then closely received over shaft 102 withing the third bore for actually supporting the pinion assembly C itself. For sealing purposes, an O-ring or similar seal 118 is received in the inner surfaces of the bushing to engage the operating member and an O-ring or similar seal 120 is received in the outer surface of the bushing to engage the wall of the third bore. Adjacent bushing 116 and proximate the outer end 28 of the third bore is a steel retaining ring 122. This retaining ring is closely received in a circumferentially extending groove 124 provided in the third bore. Thus, the entire pinion assembly C is captured between a pair of retaining rings 122 disposed at opposite ends 26,28 of the third bore.

With the above described arrangement, pinion 100 is generally centrally disposed in third bore 24 with teeth 126 being meshed with teeth 56 of elongated rack 54. It should be noted that the ends 128,130 of elongated operating member or shaft 102 extend outwardly of third bore end areas 26,28, respectively. Ends 128,130 may be conveniently affixed or coupled to mechanisms or the like for purposes of selectively controlling their operation as will be described hereinafter. Each of ends 128,130 includes an opening 132,134 extending generrally transversely therethrough for puspores of coupling the rotary actuator to such mechanisms. Also, at least one of ends 128,130 includes wrench flats (not shown) for purposes of manually rotating the operating member and pinion. A plurality of threaded fastener receiving holes 136 (FIG. 6) are included in housing A and equidistantly spaced around third bore 24 at ends 26, 28. The preferred arrangement contemplates four such holes about each end of the third although a greater or lesser number could be employed as desired. Receiving holes 136 are utilized in mounting the actuator or operably affixing mechanisms thereto.

The preferred actuator structure just described is deemed to reduce undesired tolerance build-ups or stacking between the acutuator components. Since the housing A is cast as a unitary structure the precise dimensional characteristics required for dimensional stability may be incorporated directly into the die or mold. Similarly, since the piston and end cap are also cast, receiving area 52 and position stop member 88 may be precisely, integrally formed in their parent components during casting to provide further dimensional stability. Due to the basic nature of the preferred actuator structure, there is very little structure involved in assembling the various components which would lead to tolerance stacking resulting in improper or imprecise actuator operation. Any tendency for such build-up in the first instance may be compensated for in the dies or molds themselves.

Figures 3, 4, 5, 6, 7:
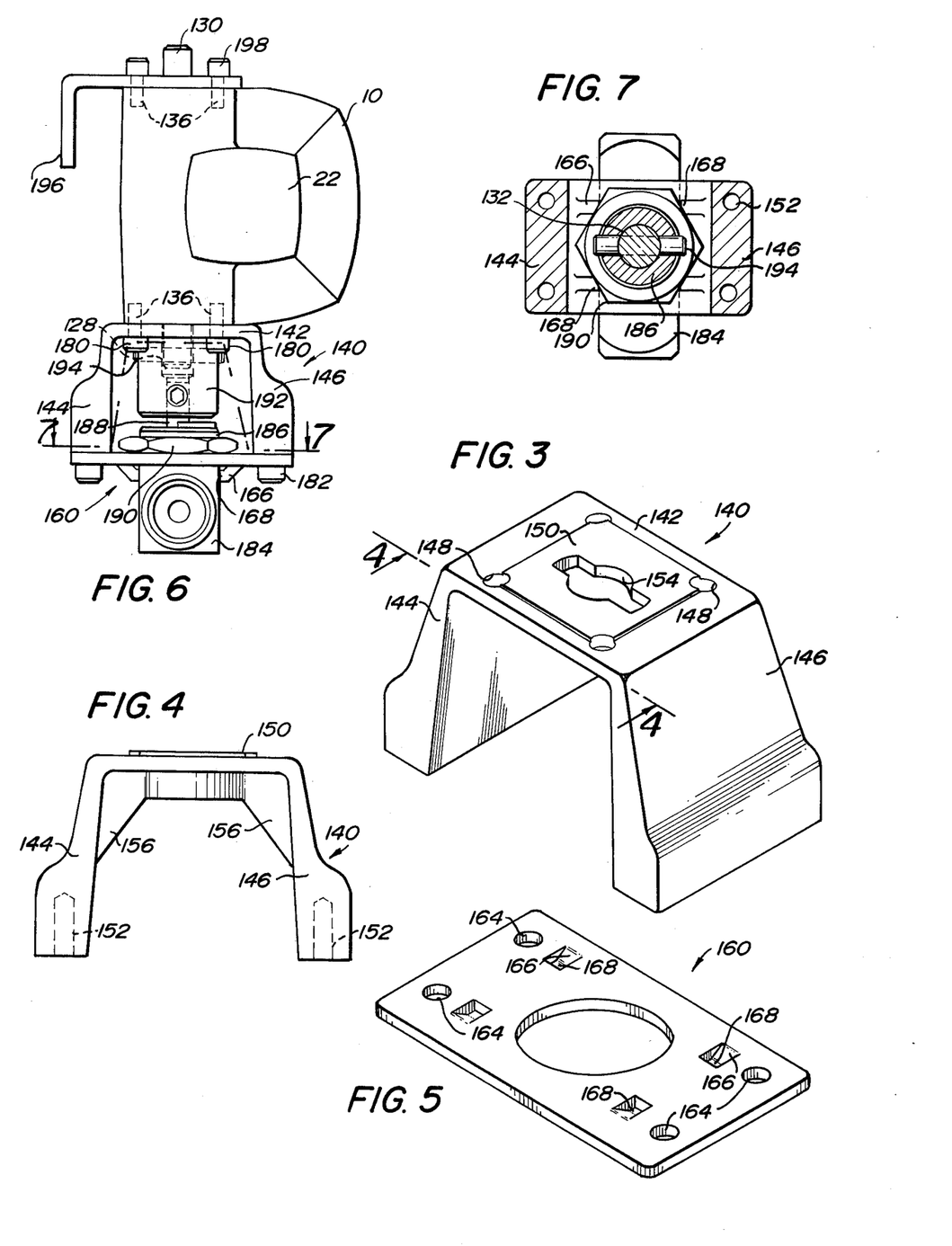
FIG. 3 is a perspective view of a mechanism mounting bracket employed with the subject rotary actuator.
FIG. 4 is a side elevational view taken along lines 4—4 of FIG. 3.
FIG. 5 is a perspective view of a mounting plate employed with the bracket shown in FIGS. 3 and 4.
FIG. 6 is an end view of the actuator showing installation for purposes of operating one type of mechanism.
FIG. 7 is a cross-sectional view taken along lines 7—7 of FIG. 6.

FIGS. 3 and 4 show a mounting bracket which is advantageously employed with the above discussed rotary actuator for purposes of mounting various mechanisms to the actuator. Accordingly, the mounting bracket is generally designated 140 and has a generally U-shaped configuration. The bracket includes a base portion 142 and a pair of spaced apart generally parallel legs 144,146 depending outwardly from the base portion. Four mounting holes 148 are equidistantly and symmetrically spaced around base portion 142 to extend therethrough for purposes of receiving fasteners which are, in turn, threadedly received in mounting holes 136 in housing A. Again, a greater or lesser amount of holes 148 could be employed without departing from the intent and scope of the present invention.

An embossed area 150 protrudes outwardly from base portion 142 and intersects each of mounting holes 148. This embossed area is substantially square and is adapted to be closely received in outermost portions 30,32 of the third bore. As noted above, portions 30,32 are also square. This arrangement provides precise, positive locating and mounting means for the bracket relative to the actuator. Since mounting holes 148 are symmetrically disposed about base portion 142 and since embossed area 150 on base portion 142 and outermost portions 30,32 of third bore 24 are square, it is possible to locate mounting bracket 140 in a plurality of positions relative to the actuator. This becomes important when the mechanisms to be operated by the actuator comprise valves or the like and when two such mechanisms are simultaneously operated by a single actuator. Sometimes, one mechanism would be closed while the other was being opened although this is by no means always the case. Since a single actuator may be utilized to directly operate two separate mechanisms, the arrangement for allowing the mounting brackets themselves to be positively located in a plurality of positions relative to the actuator facilitates substantial actuator flexibility for performing various desired controlling functions.

Disposed in the outer most ends of legs 144,146 are fastener receiving holes 152 best shown in FIG. 4. It is contemplated that four such receiving holes, two in each leg, will be advantageously employed. A coupling opening 154 is generally centrally disposed in base portion 142 to facilitate passage of one end 128 or 130 of operating member 102 therethrough for convenient coupling to a mechanism mounted to the mounting bracket. A pair of oppositely disposed ribs 156 are provided to add strength to the overall mounting bracket structure. While mounting bracket 140 could be constructed from any number of materials, in the preferred embodiment here under discussion, it is contemplated that the bracket will be die cast from aluminum.

FIG. 5 shows a mounting plate generally designated 160 which is employed in conjunction with mounting bracket 140. Plate 160 has a generally flat configuration and includes a mechanism receiving opening 162 for receiving at least a portion of the mechanism to be controlled as will be described hereinafter. Disposed adjacent the opposite ends of plate 160 are a plurality of fastener receiving holes 164. These holes are located on the plate relative to each other for registry or alignment with receiving holes 152 in mounting bracket 140 in order that plate 160 and bracket 140 may be affixed to each other. A plurality of tangs 166 having outermost ends 168 are included around opening 162 for purposes of retaining a mechanism in a fixed position thereon. It is contemplated that opposed walls of a mechanism will be captured between the opposed tangs to achieve such fixed positioning.

In the preferred embodiment of the present invention, it is contemplated that the tangs will be formed by a metal forming operation such as piercing or the like. While four such tangs have been shown, this number could be varied as desired and/or necessary. The preferred embodiment of the invention contemplates that mounting plate 160 will be formed from aluminum, steel or stainless steel although other materials and methods of construction could also be conveniently employed without departing from the intent and scope of the invention.

In assembling the components described hereinabove with reference to FIGS. 1-5, attention is directed to FIGS. 6 and 7 showing a completed assembly. Threaded members 180 pass through mounting holes 148 and are threadedly received in receiving holes 136 included in housing A about end 26 of third bore 24. Of course, the bracket could just as well be mounted at end 28 if desired since the two ends of third bore 24 are identical and equally suited for such installations. When threaded member 180 are advanced toward tight engagement with base portion 142 of mounting bracket 140, embossed area 150 is closely received in outermost portion 30 of the third bore. This, as noted above, positively locates and retains the mounting bracket in the desired position relative to the third bore and actuator.

Threaded members 182 are employed to fasten mounting plate 160 to mounting bracket 140. In the arrangement shown in FIGS. 6 and 7, mechanism 184 comprises a valve and is merely for purposes of illustrating a single application for the subject invention. The valve body is positioned on the lower side of mounting plate 160 and the side walls of the body are closely received between outer ends 168 of opposed tangs 166. A portion of the valve, namely, the bonnet 186 and the stem assembly 188 protrude upwardly through mechanism receiving opening 162 in the mounting plate. The valve is retained in position on the plate by means of a mounting nut 190 threadedly received on stem bonnet 186. Since the valve body is captured between outer ends 168 of opposed tangs 166, it cannot rotate as the stem is rotated by the rotary for purposes of valve control.

Outer end 128 of operating member 102 is connected to the valve stem by means of a coupling generally designated 192. The coupling may be of the quick release or any convenient type. As shown, however, the coupling assembly includes a pin 194 which extends through opening 132 to positively couple operating member 102. The specifics of the coupling do not form a part of the present invention and, therefore, are not described in greater detail herein. Adjacent end 28 of third bore 24 is a rotary actuator mounting bracket generally designated 196. This bracket is retained in position at end 28 by means of conventional threaded fasteners 198 received in holes 136 in housing A. Bracket 196 may be conveniently employed to mount the actuator to a wall or other rigid member for purposes of providing a stable mounting arrangement. Of course, other mounting brackets or the like may be advantageously employed as the environment and/or surrounding requirements so dictate.

With reference to FIGS. 1–7, description will hereinafter be made with regard to operation of the subject double acting rotary actuator shown for purpose of controlling or operating valve 184. Appropriate fluid connections (not shown) are made to openings 36,84 which communicate with first bore 12 on opposite faces 42,44 of piston 40. Although the arrangement shown is typically used in pneumatic systems where compressed air would be alternately admitted to openings 36,84, the subject rotary actuator could also be powered by an clean, non-corrosive fluid. Hydraulic oil, natural gas, LPG and nitrogen are satisfactory fluids for this purpose. The actual power connection to the rotary actuator does not form a part of the present invention and is, therefore, not disclosed in greater detail herein since such connections would be known to those in the art. It should be noted, however, that either the first or second position of the piston may comprise the home or normal position thereof, the control function which th actuator is to perform determining same.

With fluid pressure passing through opening 36 and into first bore 12 against face 42, the piston is forced along first bore 12 into engagement with outermost end 90 of position stop 88. In this condition, the piston is deemed to be in the first position and is retained in that position until fluid pressure from opening 36 is released and fluid pressure is passed through opening 84 and applied against face 44 in order to force the piston toward stop area 18 which defines the second position of the piston. During movement of the piston from the first to the second and from the second back to the first positions, rack 58 is caused to be moved into and out of second bore 16. This movement, the teeth of the rack and pinion being nested with one another, causes pinion 100 to be rotated thereby in turn rotating operating member or shaft 102 which is keyed to the pinion.

The amount of pinion rotation is controlled wholly by the longitudinal distance the piston travels between the first and second positions. In the arrangement shown in FIG. 1, for example, the distance between the first and second positions is such that the pinion is only moved 90° between the first and second positions. Stop area 18 and position stop 88 may be conveniently used to vary the amount of rotation for the pinion and operating member as desired and/or necessary. Because of the elimination of tolerance build-ups, the amount of pinion movement may be held to very close tolerances. Even with backlash between teeth 56,126, rotational movement may be held to within 0.5°. In many environments, the degree of accuracy of rotation may not be critical; however, in some ennvironments and with some type of valves and automated instruments and systems, the accuracy of rotation is necessary for the most effective operation.

If it is desired to have a greater or lesser amount of pinion rotation than that obtained with the specific structural arrangement shown in FIG. 1, it is merely necessary to reestablish the first position for the piston a greater or lesser distance from the second position. For example, if 180° of pinion rotation is desired, end cap 80 may be replaced with another end cap wherein position stop 88 does not extend outwardly from inner surface 86 as far as that shown in FIG. 1. Thus, the first and second positions of the pinion are spaced further apart from each other to result in greater pinion rotation. Inasmuch as the dimension and characteristics of engagement between the rack and pinion for the actuator are known, it merely is necessary to calculate the dimensions of the stop required for purposes of achieving 180° of pinion rotation. Other variations in the limits of rotation for the pinion may be achieved in a similar manner.

The positive stop arrangement in the subject rotary actuator is deemed particularly advantageous from the standpoint that the first and second position stops remain positive and constant and may not be inadvertently altered or modified during use so as to cause malfunctions within any mechanism or system controlled thereby. This feature is deemed to be particularly significant in systems of the type requiring very precise control.

As operating member or shaft 102 is rotated by pinion 100, it causes a corresponding rotational movement, through coupling 192, of stem assembly 188 of mechanism or valve 184. For many valves and mechanisms, the 90° of rotation achieved by the arrangement of the actuator shown in FIG. 1 is sufficient to move such mechanisms between fully opened and fully closed conditions. For different mechanism arrangements, 180° or some other rotation may be required and is governed by the nature of the mechanism to be controlled. These variations in control requirements are provided for in the subject invention as discussed above.

If desired, the wall mounting or actuator mounting bracket 196 shown in FIG. 6 can be replaced with a second mounting bracket 140 in order that the two valves 184 may be simultaneously controlled by the single actuator. In this regard, it may be desired to mount the second bracket rotated 90° relative to the first bracket in order to provide for convenient installation and hook-up for the mechanisms or system involved. This, again, depends on the specifics of the system requirements. Because embossed area 150 on base portion 142 of mounting bracket 140 as well as outermost end portion 30,32 of bore 24 are symmetrical, this rotated mounting between the two mounting brackets is made conveniently possible. In the various possible rotated positions of the mounting brackets, positive location thereof relative to the actuator is obtained. Here too the symmetrical disposition of mounting holes 148 in mounting brackets 140 permit such mountings while not requiring any additional mounting holes in the rotary actuator housing A other than holes 136.

Figure 8:
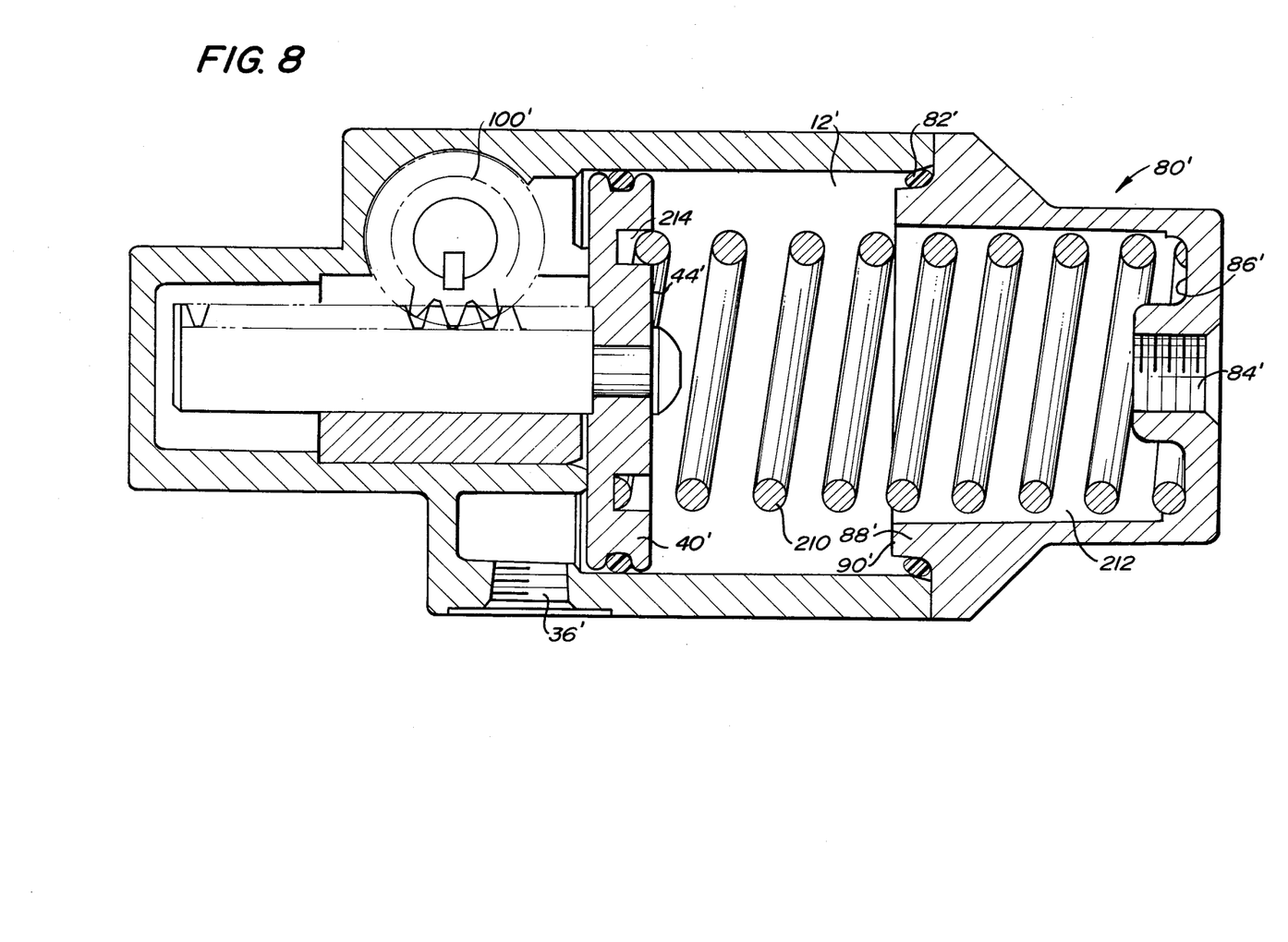
FIG. 8 is a cross-sectional view of a second embodiment of the subject rotary actuator.
Figure 9:
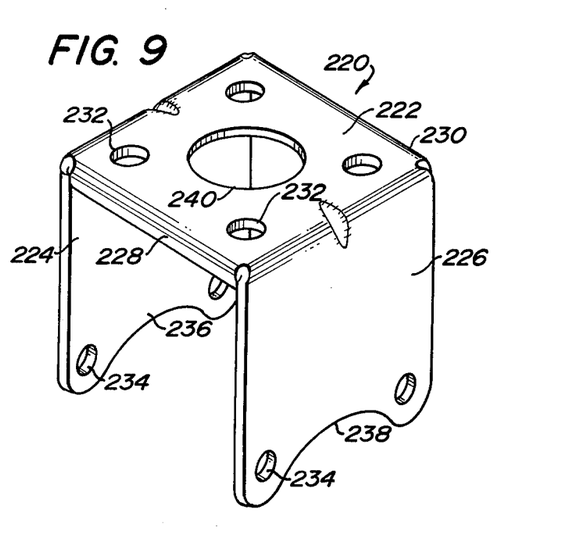
FIG. 9 is an alternative arrangement for a mechanism mounting bracket.
Figure 10:
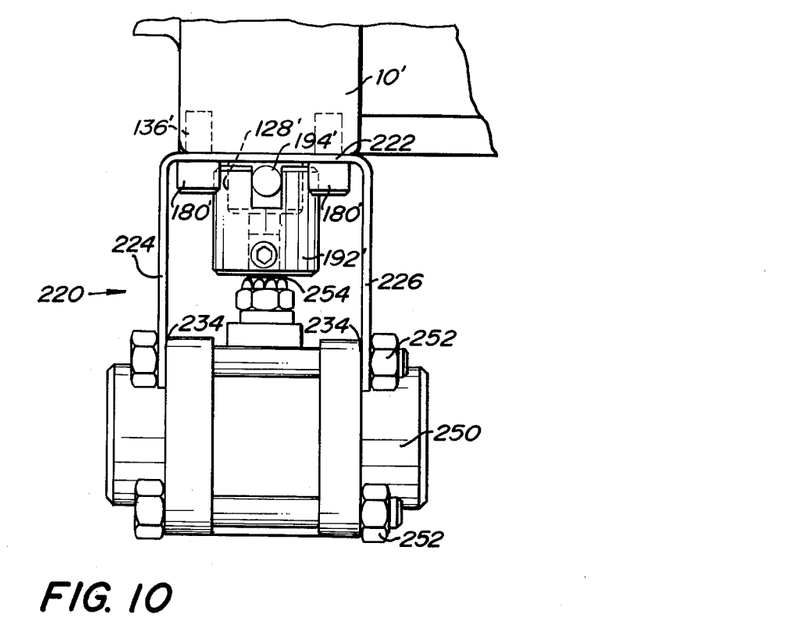
FIG. 10 is a partial view showing the bracket of FIG. 9 installed on the rotary actuator.

FIG. 8 shows modification of the double acting actuator of FIG. 1 to a single acting actuator with a spring biased return mechanism. FIGS. 9 and 10 show alternative arrangements for mounting a different type of mechanism to an actuator of the subject invention. In these alternative embodiments, like numerals which include a prime suffix (') are employed to designate like components and new numerals are employed to designate new components. In FIG. 8, end cap 80 has been replaced with a modified end cap 80'. Disposed between face 44' of piston 40' and inner surface 86' of the end cap is a spring biasing means generally designated 210 which continuously urges the piston toward the second position. End cap 80' is generally cup-shaped to include a cavity therein generally designated 212 adapted to receive spring biasing member 210 therein. Likewise, end face 44' of the piston includes a generally circular spring receiving groove 214 in order that spring biasing means 210 may be positively captured in bore 12' between the piston and the end cap.

End cap 80' also includes an opening 84' adapted to receive a conventional fitting. It should be particularly noted in FIG. 8 that stop 88' having outermost end 90' for establishing a first position for piston 40' is much shorter than that shown in FIG. 1. The arrangement of FIG. 8 increases the distance between the first and second positions such that movement of pinion 100' is equal to 180° as the piston is moved between the two extreme positions. Of course and as discussed above, these stops could be identical to that shown in FIG. 1 so as to merely yield 90° of rotation or any other desired amount. In FIG. 8, fluid power is again admitted to first bore 12' through opening 36' in order to act against the piston and force it from the second toward the first position. When fluid pressure is released, spring biasing means 210 forces the piston from the first back toward the second position. In this arrangement, opening 84' is typically used to vent air into bore 12' from outside the rotary actuator. When the actuator is employed in a contaminated environment, a tube or pipe may be conveniently affixed to opening 84' for purposes of venting the actuator to clean or non-contaminated air. When opening 84' is merely used for venting, seal 82' is not required; however, when the unit is employed in a contaminated environment, seal 82' is advantageously included. Likewise, it would also be possible to apply fluid pressure to piston 40' through opening 84' if deemed necessary and/or desirable. As with the embodiment of FIG. 1, the actuator may be set up so that either the first or second positions of piston 40' as described would comprise the home or normal position of the actuator.

FIG. 9 shows an alternative arrangement for a mounting bracket having particular application to mounting a typical ball valve. Accordingly, this alternative mounting bracket is generally designated 220, also having a generally U-shaped configuration. The bracket is comprised of a base portion 222 and spaced apart, generally parallel legs 224,226 depending outwardly of the base portion. Short side flanges 228,230 extend outwardly a slight distance from the base portion in the same direction as legs 224,226 on opposite sides of the base portion. A plurality of bracket mounting holes 232 are provided for purposes of conveniently affixing the mounting bracket to the rotary actuator by means of conventional threaded fasteners. Mounting holes 232 are equidistantly spaced around base portion 222 in order that the bracket may be rotated relative to the actuator body for purposes discussed hereinabove with reference to the other embodiments. Adjacent the outermost end of legs 224,226 are mechanism mounting holes 234 and disposed between these mounting holes are arcuate mechanism relief areas 236,238 for purposes of mechanism nesting. Generally centrally disposed in base portion 222 is a coupling opening 240 which facilitates coupling of operating or shaft member 102 to the mechanism itself.

FIG. 10 shows a mechanism 250 which comprises a typical ball valve mounted in operative association with the rotary actuator of the subject invention. As will be noted, a portion of the ball valve body is received between legs 224,226 with threaded members and nuts 252 employed to retain the valve in an assembled condition passing through mounting holes 234. The upper portion of the valve body is nested in relief areas 236,238. Normally, such bolt and nut members 252 are employed for purposes of assembling the valve and just the upper two of these assemblies are used for mounting valve 250 to bracket 220. Stem assembly 254 projects upwardly toward end 128' of the operating member or shaft for coupling therewith by means of coupling member 192' and a pin 194' as hereinabove discussed with reference to the other embodiment of the present invention. Mounting bracket 220 is retained in position on the rotary actuator by means of conventional threaded members 180' passing through mounting holes 232 and into receiving holes 136' in the actuator housing itself as was also hereinabove described. It is also entirely possible to operate two mechanisms as discussed above when either the bracket 220 or a combination of that bracket and other mounting arrangements are employed.

The subject rotary actuator is deemed to provide a versatile actuator which has many applications in many environments for purposes of automatically controlling or operating various mechanisms. While the invention has been described in the subject application with reference to valves, it should be appreciated that such is merely by way of example and that any number of other mechanisms could also be operated with the device. The subject rotary actuator development reduces tolerance build-ups or stacking encountered with prior rotary actuators of the type involved, to provide positive engagement and guiding for the rack member relative to the pinion, to provide positive establishment of first and second positions for linear movement of the piston in order that the rotary movement of the pinion itself may be precisely controlled and to provide means for precisely locating and positively mounting mechanism mounting brackets to the actuator.

The invention has been described with reference to the preferred embodiment. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A rotary actuator comprising in combination:
    a unitary housing having first and second cylindrical bores communicating with each other in an end to end relationship with at least the end of said first bore spaced from said second bore being open, said housing further including an open ended third bore communicating with and extending generally normal to said second bore;
    a piston closely received in said first bore and selectively movable between first and second positions therein;
    an elongated rack extending outwardly of one face of said piston into said second bore, said rack having a generally rectangular cross sectional configuration with the teeth of said rack being disposed longitudinally along the upper surface thereof;
    a pinion disposed in said third bore in operative association with said rack, said pinion including an elongated operating member extending outwardly of said third bore;
    a separate bushing member disposed in said second bore at least on the other side thereof from the operative interconnection between said rack and pinion for guiding and supporting said rack, said bushing member extending along at least a longitudinal portion of said second bore and including an outer wall configuration closely received in said second bore, said bushing member further including a longitudinally extending groove having the same cross sectional configuration as said rack and dimensioned to receive the bottom wall surface and a portion of the side wall surface of at least a portion of said rack in a sliding relationship therein;

means for closing the open end of said first bore;

means for selectively forcing said piston between said first and second positions to effect rotary movement of said pinion and operating member through linear movement of said rack in operative engagement with said pinion; and, means for establishing a precise desired distance between said first and second positions in said first bore for controlling the amount of rotation of said pinion.

2. The actuator as defined in claim 1 wherein the outer wall of said bushing member closely engages said second bore in excess of 180° of the circumference thereof, said groove receiving the bottom wall surface and a majority of the side wall surfaces of that portion of the length of said rack received therein.

3. The actuator as defined in claim 1 wherein said piston includes a rack receiving area in one face thereof dimensioned to closely receive one end of said rack in a position disposed generally normal to said one face said rack and piston being mechanically interconnected by mechanical means passing through said piston into engagement with said one end of said rack.

4. The actuator as defined in claim 1 wherein said force means comprises fluid orifices communicating through said housing with said first bore adjacent said first and second positions of said piston for allowing alternating fluid flow into said first bore on opposite sides of said piston for selectively forcing said piston between said first and second positions.

5. The actuator as defined in claim 1 wherein said force means comprises a fluid orifice communicating through said housing with said first bore adjacent one of said first and second positions of said piston for selectively admitting fluid against one side of said piston and spring biasing means operating against the other side of said piston.

6. The actuator as defined in claim 5 wherein said fluid orifice is disposed adjacent the second position of said piston and said spring biasing means is disposed between said piston and said closing means for continuously urging said piston from said first toward said second position.

7. The actuator as defined in claim 1 wherein said unitary housing further includes a distinct area adjacent at least one end of said third bore for precisely receiving and positively locating a mounting bracket to said housing, said area comprising a mounting bracket receiving recess surrounding at least a portion of said at least one end of said third bore on said housing and extending inwardly along said third bore from said one end.

8. The actuator as defined in claim 7 wherein a mounting bracket receiving recess is included in said housing at each end of said third bore, said recesses completely surrounding said third bore ends and extending inwardly along said third bore therefrom.

9. A rotary actuator comprising in combination:

a unitary housing having first and second coaxial cylindrical bores, said first bore having a diameter larger than said second bore with the interface between said first and second bores defining a position stop for a second position in said first bores for a piston and the end of said first bore spaced from said second bore being open, said housing further including an open ended third bore communicating with and extending generally normal to said second bore;

a piston closely received in said first bore and selectively slidable therein between first and second positions, said piston including a rack receiving recess in one face thereof;

an elongated rack having a generally rectangular cross-section with one end thereof positioned in said receiving recess and affixed to said one face of said piston so as to extend outwardly therefrom generally normal to said one face and into said second bore;

a pinion assembly disposed in said third bore including a pinion disposed in operative association with said rack, the teeth of said pinion engaging teeth in the upper surface of said rack with said pinion being received on an elongated operating member protruding outwardly from said housing at both ends of said third bore, said pinion assembly further including bearing assemblies comprising: a retaining clip received on said operating member adjacent each side of said pinion; an annular thrust washer received over said operating member adjacent each side of said pinion; an operating member bushing closely received in said third bore and over said operating member adjacent each of said thurst washers, said operating member bushings further including sealing means thereon; and, a retaining ring disposed adjacent each of said operating member bushings in locking engagement with the side wall of said third bore;

a rack bushing received in said second bore at least on the other side thereof from the operating engagement between said rack and pinion for guiding and supporting said rack, said rack bushing extending at least along a longitudinal portion of said second bore with the outer wall of said rack bushing being closely received in engagement with said second bore, said rack bushing further including a longitudinal rack receiving groove for receiving the bottom wall surface and a portion of the side wall surfaces of at least a portion of the length of said rack;

an end cap for closing the open end of said first bore, said end cap including a piston stop for positively defining a first position for said piston in said first bore; and, means for selectively forcing said piston between said first and second positions to effect rotary movement of said pinion and operating member through linear movement of said rack in operative engagement with said pinion.

10. The actuator as defined in claim 9 wherein the outer surface of said rack bushing engages said second bore in excess of 180° of the circumference of the second bore, said rack receiving groove receiving the bottom wall surface and a majority of the side wall surfaces of that portion of said rack communicating with said rack bushing.

11. The actuator as defined in claim 9 wherein said force means comprises fluid orifices communicating with said first bore adjacent said first and second positions of said piston for allowing alternating fluid flow into said first bore on opposite sides of said piston for selectively forcing said piston between said first and second positions.

12. The actuator as defined in claim 9 wherein said force means comprises a fluid orifice communicating with said first bore adjacent one of said first and second positions for selectively admitting fluid against one side of said piston and spring biasing means operating against the other side of said piston.

13. The actuator as defined in claim 12 wherein said fluid orifice is disposed adjacent the second position of said piston and said spring biasing means is disposed between said piston and end cap for continuously urging said piston toward said second position.

14. The actuator as defined in claim 9 wherein said housing further includes a distinct area adjacent at least one end of said third bore for precisely receiving and positively locating a mounting bracket to said housing.

15. The actuator as defined in claim 14 wherein said area comprises a mounting bracket receiving recess surrounding at least a portion of said at least one end of said third bore on said housing.

16. The actuator as defined in claim 15 wherein a mounting bracket receiving recess is included in said housing at each end of said third bore, said recesses completely surrounding said third bore ends.

17. A rotary actuator comprising in combination:
a unitary housing having first and second cylindrical bores communicating with each other in an end to end relationship with at least the end of said first bore spaced from said second bore being open, said housing further including an open ended third bore communicating with and extending generally normal to said second bore;
a piston closely received in said first bore and selectively movable between first and second positions therein;
an elongated rack extending outwardly of one face of said piston into said second bore;
a pinion disposed in said third bore in operative association with said rack, said pinion being received on an elongated operating member and affixed thereto to prevent relative rotation therebetween with said operating member extending outwardly of said third bore, said pinion being generally centrally disposed in said third bore;
a bearing assembly positioned on each side of said pinion in said third bore, said bearing assemblies being comprised of (1) a retaining clip received on said operating member closely adjacent each side face of said pinion, (2) an annular thrust washer received over said operating member and retaining clip closely adjacent each side face of said pinion, (3) an operating member bushing closely received in said third bore and over said operating member adjacent each of said thrust washers, said operating member bushings further including sealing means thereon, and (4) a retaining ring disposed adjacent each of said operating member bushings in locking engagement with the side wall of said third bore, said retaining rings maintaining said pinion, operating member and the remainder of said bearing assemblies in position in said third bore;
a separate bushing member disposed in said second bore at least on the other side thereof from the operative interconnection between said rack and pinion for guiding and supporting said rack;
means for closing the open end of said first bore;
means for selectively forcing said piston between said first and second positions to effect rotary movement of said pinion and operating member through linear movement of said rack in operative engagement with said pinion; and,
means for establishing a precise desired distance between said first and second positions in said first bore for controlling the amount of rotation of said pinion.

18. In a rotary actuator of the type which converts linear movement to rotary movement for purposes of providing rotational forces for controlling a mechanism operably coupled to an operating member extending outwardly from at least one side of the rotary actuator housing, the improvement comprising:
a distinct mounting and locating area symmetrically disposed on said housing positioned adjacent and generally normal to the longitudinal axis of said operating member;
a mechanism mounting bracket having a base portion and a mechanism receiving portion, said base portion including an area thereon dimensioned to register and physically communicate with said housing mounting and locating area for precisely locating said mounting bracket relative to said housing, said base portion area of said mounting bracket being symmetrically disposed on said base portion in order that said mounting bracket may be precisely located on said housing in a plurality of positions relative thereto, said mounting bracket having a generally U-shaped configuration with the legs of said configuration comprising said receiving portion and defining mounting legs, said mounting bracket further including a mechanism mounting plate extending between said legs adjacent the outermost ends thereof; and,
means for rigidly retaining said bracket on said housing in the desired located position.

19. The improvement as defined in claim 18 wherein said mounting plate includes a mechanism receiving opening therein and separate members adapted to engage a mechanism received therein for preventing rotation of the mechanism during rotation of said operating member coupled thereto.

20. The improvement as defined in claim 19 wherein said separate members comprise a plurality of tangs having outermost ends, the outermost ends of selected of said tangs being spaced apart and generally opposed to each other for defining a mechanism receiving zone therebetween.

21. The improvement as defined in claim 20 wherein said mounting plate includes a plurality of pairs of said tangs depending from the lower surface of said plate, the tangs of each pair being opposed to and spaced apart from each other.

* * * * *